United States Patent
Wei

(10) Patent No.: US 11,115,748 B2
(45) Date of Patent: Sep. 7, 2021

(54) WEARING DETECTION METHOD AND APPARATUS, WEARABLE DEVICE AND STORAGE MEDIUM

(71) Applicant: Shenzhen Goodix Technology Co., Ltd., Shenzhen (CN)

(72) Inventor: Haijun Wei, Shenzhen (CN)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 0 days.

(21) Appl. No.: 17/036,284

(22) Filed: Sep. 29, 2020

(65) Prior Publication Data
US 2021/0014603 A1    Jan. 14, 2021

Related U.S. Application Data

(63) Continuation of application No. PCT/CN2018/123844, filed on Dec. 26, 2018.

(51) Int. Cl.
*H04R 1/10* (2006.01)
*G06F 3/044* (2006.01)

(52) U.S. Cl.
CPC ........... *H04R 1/1041* (2013.01); *G06F 3/044* (2013.01); *H04R 1/1016* (2013.01); *H04R 2420/07* (2013.01)

(58) Field of Classification Search
CPC ...... H04R 1/1041; H04R 1/1016; G06F 3/044
See application file for complete search history.

(56) References Cited

U.S. PATENT DOCUMENTS

| | | | |
|---|---|---|---|
| 2007/0121959 A1 | 5/2007 | Philipp | |
| 2013/0249849 A1* | 9/2013 | Wong | G02B 27/017 345/174 |
| 2014/0321682 A1* | 10/2014 | Kofod-Hansen | H04R 25/30 381/315 |
| 2017/0078780 A1 | 3/2017 | Qian et al. | |
| 2018/0014103 A1* | 1/2018 | Martin | H04R 1/1025 |
| 2020/0037058 A1* | 1/2020 | Ueda | G06F 3/03547 |

FOREIGN PATENT DOCUMENTS

| | | |
|---|---|---|
| CN | 103002373 A | 3/2013 |
| CN | 106291121 A | 1/2017 |
| CN | 106792314 A | 5/2017 |

(Continued)

OTHER PUBLICATIONS

International Search Report dated Sep. 27, 2019 in corresponding International Application No. PCT/CN2018/123844; 5 pages.

(Continued)

*Primary Examiner* — Simon King
(74) *Attorney, Agent, or Firm* — Maier & Maier, PLLC

(57) ABSTRACT

Provided are a wearing detection method and apparatus, a wearable device and a storage medium. At least two positions of the wearable device are provided with sensors. The method includes: acquiring detection data of capacitive sensors at the at least two positions, obtaining linear combination data according to the detection data of the capacitive sensors at the at least two positions by using a pre-set relationship; and detecting a wearing state according to the linear combination data. According to the embodiments, the accuracy of wearing detection can be improved.

18 Claims, 8 Drawing Sheets

(56) References Cited

FOREIGN PATENT DOCUMENTS

| | | | |
|---|---|---|---|
| CN | 107065016 | A | 8/2017 |
| CN | 107810535 | A | 3/2018 |
| CN | 108702567 | A | 10/2018 |
| CN | 108810693 | A | 11/2018 |
| CN | 108810788 | A | 11/2018 |
| CN | 108848427 | A | 11/2018 |
| CN | 109725716 | A | 5/2019 |
| CN | 209134600 | U | 7/2019 |

OTHER PUBLICATIONS

Office Action dated Sep. 27, 2019 in corresponding Chinese Application No. 201880002958.0; 18 pages.
Notification to Grant Patent Right for Invention dated Jul. 27, 2020 in corresponding Chinese Application No. 201880002958.0; 6 pages.
Extended European Search Report dated Mar. 29, 2021, in connection with corresponding EP Application No. 18944371.6; 8 pages.

\* cited by examiner

WEARING DETECTION METHOD AND APPARATUS, WEARABLE DEVICE AND STORAGE MEDIUM

CROSS-REFERENCE TO RELATED APPLICATIONS

This application is a continuation of the International Application No. PCT/CN2018/123844, filed on Dec. 26, 2018, the content of which is incorporated herein by reference in its entirety.

TECHNICAL FIELD

Embodiments of the present application relate to the technical field of wearable devices, and in particular to a wearing detection method and apparatus, a wearable device and a storage medium.

BACKGROUND

Due to portability, functional diversity and the like of wearable devices, more and more users are accustomed to using the wearable devices to achieve corresponding functions. With the popularity of the wearable devices, people are paying more and more attention to an endurance ability of the wearable devices.

In order to ensure the effective endurance of a wearable device and provide services as long as possible, an application of the wearable device may be stopped when the wearable device is not worn, and the application of the wearable device may be started when the wearable device is worn. In order to ensure an accurate control of the wearable device, detection of its wearing state is particularly important. At present, the wearable device can realize the detection of the wearing state through a single-channel solution, that is, a sensor is configured at only one position of the wearable device, and a wearing operation is determined according to data detected by the sensor.

However, the wearable device that performs wear detection through the single-channel solution has low accuracy in wearing detection, and especially, when the wearable devices is exposed to water or sweat, misjudgment problems such as mis-wearing and mis-dropping are easy to occur during the wearing detection.

SUMMARY

Embodiments of the present application provide a wearing detection method and apparatus, a wearable device, and a storage medium to improve wearing detection accuracy of the wearable device.

An embodiment of the present application provides a wearing detection method for a wearable device, where at least two positions of the wearable device are provided with capacitive sensors, and the method includes:

acquiring detection data of the capacitive sensors at the at least two positions;

obtaining linear combination data according to the detection data of the capacitive sensors at the at least two positions by using a pre-set linear relationship;

determining, according to the linear combination data, whether an operation behavior that changes a pre-set initial state of the wearable device is detected;

determining a state of the wearable device to be a target state of the operation behavior if the operating behavior is detected; and determining the state of the wearable device to be the pre-set initial state if the operating behavior is not detected.

An embodiment of the present application further provides a wearing detection apparatus for a wearable device, where at least two positions of the wearable device are provided with capacitive sensors, and the apparatus includes:

an acquiring module, configured to acquire detection data of the capacitive sensors at the at least two positions;

a detecting module, configured to obtain linear combination data according to the detection data of the capacitive sensors at the at least two positions by using a pre-set linear relationship; and determine whether an operation behavior that changes a pre-set initial state of the wearable device is detected according to the linear combination data; and a determining module, configured to determine a state of the wearable device to be a target state of the operation behavior if the operation behavior is detected; or determine the state of the wearable device to be a pre-set initial state if the operation behavior is not detected.

An embodiment of the present application further provides a wearable device, including: a device body, and at least two positions in the device body are provided with capacitive sensors, and the device body further includes a processor and a memory, where the processor is connected to the capacitive sensors at the at least two positions and the processor is also connected to the memory;

the memory is configured to store program instructions; and the processor is configured to execute the wearing detection method for a wearable device when calling the program instructions stored in the memory.

An embodiment of the present application further provides a computer-readable storage medium that stores a computer program, and when the computer program is executed by a processor, the wearable detection method for a wearable device described above is implemented.

The embodiments of the present application provide a wearing detection method and apparatus, a wearable device and a storage medium, which can acquire detection data of capacitive sensors at at least two positions of the wearable device, obtain linear combination data according to the detection data of the capacitive sensors at the at least two positions by using a pre-set relationship, and then determine whether an operation behavior that changes a pre-set initial state of the wearable device is detected according to the linear combination data, determine a state of the wearable device to be a target state of the operation behavior if the operation behavior is detected, and determine the state of the wearable device to be the pre-set initial state if the operation behavior is not detected. In the method, linear combination data is obtained according to the detection data of the capacitive sensors at the at least two positions by using a pre-set linear relationship, an operation behavior that changes a pre-set initial state of the wearable device is detected according to the linear combination data, and then a state of the wearable device is determined, which can effectively avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device.

BRIEF DESCRIPTION OF DRAWINGS

In order to describe the technical solutions in embodiments of the present application or in the prior art more clearly, the accompanying drawings required for describing the embodiments or the prior art are briefly introduced in the following. Apparently, the accompanying drawings in the following description illustrate some embodiments of the present application, and persons of ordinary skill in the art may still derive other drawings from these accompanying drawings without creative effort.

DETAILED DESCRIPTION OF EMBODIMENTS

In order to make objectives, technical solutions, and advantages of embodiments of the present application clearer, the technical solutions in embodiments of the present application are described clearly and comprehensively in the following with reference to the accompanying drawings in embodiments of the present application. Apparently, the described embodiments are part rather than all of embodiments of the present application. All other embodiments obtained by persons of ordinary skill in the art based on the embodiments of the present application without creative effort shall fall within the protection scope of the present application.

Unless otherwise defined, all technical and scientific terms used herein have same meanings as commonly understood by those skilled in the technical field of the present application. The terms used in the specification of the present application herein is for a purpose of describing specific embodiments, and is not intended to limit the present application. The term "and/or" as used herein includes any and all combinations of one or more related listed items. Some embodiments of the present application will be described in detail with reference to the accompanying drawings. In a case of no conflict, the following embodiments and features in the embodiments can be combined with each other.

The following embodiments of the present application provide a wearing detection method, which can be applied to any wearable device such as a smart bracelet, a smart watch, an earphone, and a hearing aid device. If the wearable device is the earphone, it may be a wired earphone or a wireless earphone. If it is the wireless earphone, it may be an earphone that uses Bluetooth technology to transmit data, that is, a Bluetooth earphone; it may also be an earphone that uses infrared technology to transmit data, that is, an infrared earphone; it may also be a 2.4G earphone that uses 2.4G frequency band wireless technology to transmit data.

Before introducing a wearing detection method of a wearable device, the earphone is taken as an example to illustrate a structure of the wearable device.

Figure 1A:
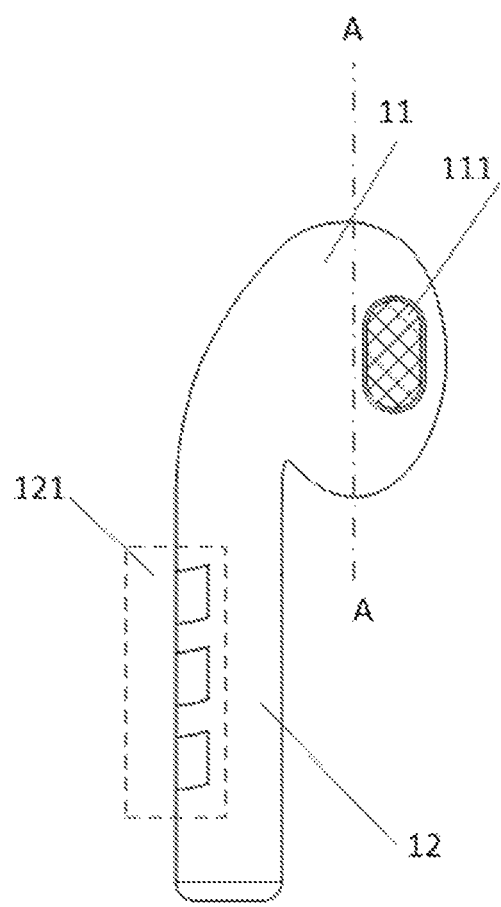
FIG. 1A is an appearance schematic diagram of an earphone according to an embodiment of the present application.
Figure 1B:
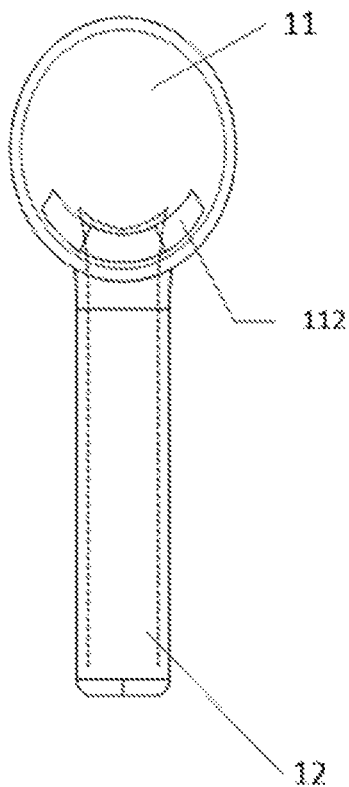
FIG. 1B is a cross-sectional view of a first part of the earphone along a section line A-A according to the embodiment of the present application.
Figure 1C:
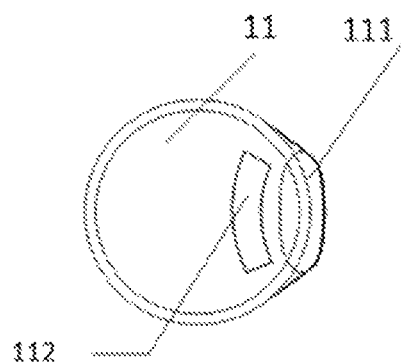
FIG. 1C is a cross-sectional view of a second part of the earphone along a section line A-A according to the embodiment of the present application.

FIG. 1A is an appearance schematic diagram of an earphone according to an embodiment of the present application. FIG. 1B is a cross-sectional view of a first part of the earphone along a section line A-A according to the embodiment of the present application. FIG. 1C is a cross-sectional view of a second part of the earphone along the section line A-A according to the embodiment of the present application. An earphone body 11 shown in FIGS. 1A-1C is of an in-ear type. In practical applications, the earphone body 11 may also be in other forms such as a head-mounted type or a hanging-ear type. Optionally, the wireless earphone further includes: an earphone stem 12. The earphone stem 12 may have a control area 121. On the earphone stem 12, the control area 121 may have physical control buttons, or a touch panel, to receive an input control command to control an operation of the wireless earphone, such as adjusting volumes, starting playback, pausing playback, fast forward playback, backward playback and other operations, according to the control command. If the control area 121 has the touch panel, a touch sensor may be configured in the touch panel to receive an input control command.

As shown in FIG. 1A, the headphone body 11 may be a part having an audio output interface 111, and the audio output interface 111 may be a device such as a player or a speaker, etc. Sensors are provided at at least two positions in the earphone body 11. The at least two positions where the sensors are provided in the earphone body 11 may include, for example, a position near an end of the earphone stem 12 in the earphone body 11 shown in FIG. 1B, and a position near the audio output interface 111 in the earphone body 11 shown in FIG. 1C. Of course, the at least two positions may also be other positions of the earphone body 11, and are not limited to the two positions shown in FIGS. 1B and 1C. At least one sensor 112 may be provided at each position of the earphone body 11.

Figure 1D:
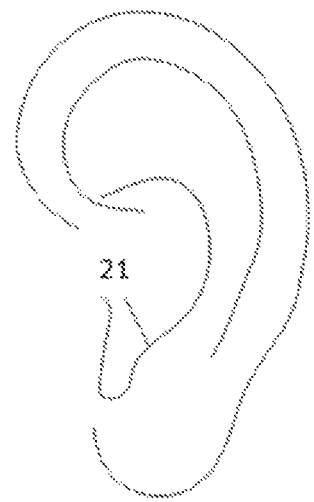
FIG. 1D is a schematic diagram of a contact position of a sensor at a position of the earphone with an ear according to the embodiment of the present application.
Figure 1E:
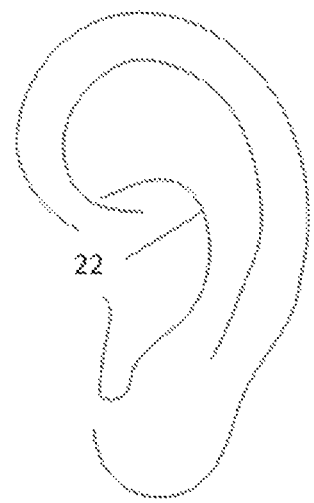
FIG. 1E is a schematic diagram of a contact position of a sensor at another position of the earphone with an ear according to the embodiment of the present application.

FIG. 1D is a schematic diagram of a contact position between a sensor at a position of the earphone and an ear according to the embodiment of the present application. FIG. 1E is a schematic diagram of a contact position between a sensor at another position of the earphone and an ear according to the embodiment of the present application. For example, a sensor 112 is provided at the position near the end of the earphone stem 12 in the earphone body 11 shown in FIG. 1B, and the position near the end of the earphone stem 12 may correspond to a first position 21 in the ear. When the earphone is in a wearing state, that is, located in the ear, the earphone may contact the first position 21 in the ear. A sensor 112 is provided at a position near an end of the audio output interface 111 in the earphone body 11 shown in FIG. 1C, and the position near the end of the audio output interface 111 may correspond to a second position 22 in the ear. When the earphone is in the wearing state, that is, located in the ear, the earphone may contact the second position 22 in the ear.

Optionally, among the at least two positions, there are at least positions, and a distance between the at least two positions may be greater than or equal to a pre-set distance.

Since a position range of mis-touching or mis-dropping is usually limited, if the distance between the at least two positions is greater than or equal to the pre-set distance, then based on detection data of the sensors at the at least two position, a wearing operation of the earphone may be determined, which could avoid misjudgment problems such as mis-touching or mis-dropping more effectively.

The sensor 112 disposed at each position may be a sensor for wearing detection. Detection data of the sensor 112 at each position may be the detection data of any physical quantity. The sensor may also be called a wearing detection sensor or a wearing sensor. The sensor is a capacitive sensor, that is, its detection data is capacitive data.

In the earphone body 11 or the earphone stem 12 of the earphone, there may further include: a processor (not shown), the processor may be connected to the sensor at each position in the earphone body 11 to acquire detection data of the sensor at each position, and then determine an operation behavior that changes an earphone state according to the detection data of the sensors at the at least two positions.

In the earphone according to the embodiment of the present application, since the at least two positions in the earphone 11 are provided with the sensors, the operation behavior that changes the earphone state can be detected more accurately according to the detection data of the sensors at the at least two positions.

It should be noted that the earphone is only a possible example of the wearable device. If it is another wearable device, at least two positions of that wearable device may be provided with sensors, and the at least two positions may be at least two positions on a wearing contact surface of the wearable device.

The appearance of the earphone shown in FIG. 1A is only a possible example. In practical applications, the earphone may have other appearances, which is not limited by the present disclosure. The positions of the sensors 112 in the earphone body 11 of the earphone shown in FIGS. 1B and 1C are only some examples of possible positions. In practical applications, the sensor may also be arranged at other positions in the earphone body 11, which is not limited in the present application. The FIGS. 1D and 1E are only the schematic diagrams of the contact positions between the sensors 112 in the earphone body 11 and the inside of the ear, and the contact positions may also be other examples, which is not limited by the present disclosure.

The wearing detection method for a wearable device according to embodiments of the present application will be described in detail in combination with various embodiments.

Figure 2:
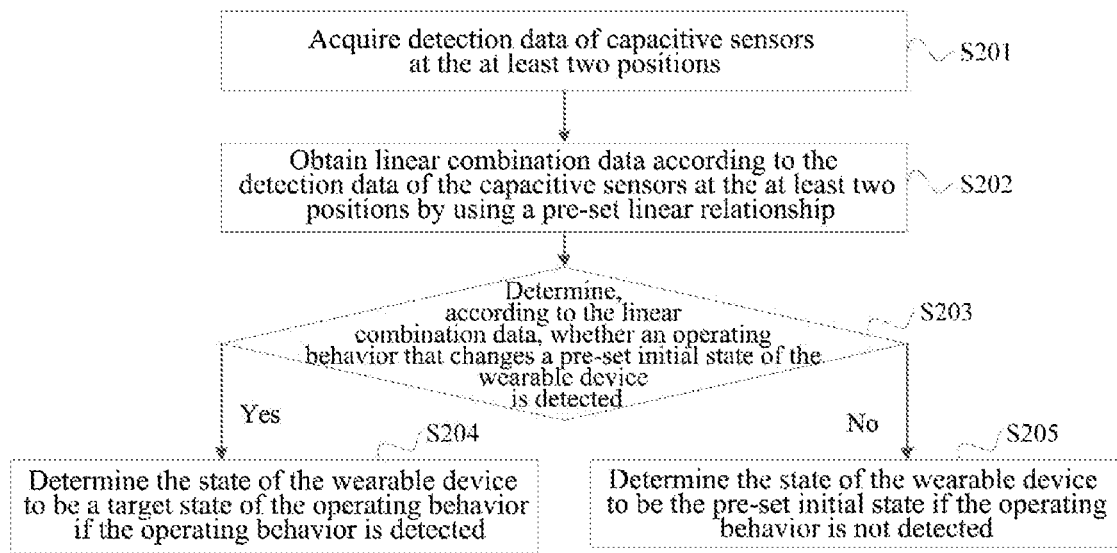
FIG. 2 is a first flow chart of a wearing detection method for a wearable device according to an embodiment of the application.

FIG. 2 is a first flow chart of a wearing detection method for a wearable device according to an embodiment of the application. The wearable device may be, for example, the earphone shown in FIGS. 1A-1C described above. Since earplugs of the earphones are usually used in pairs, the wearing detection method may be realized by a pre-set earplug of the earphone through software and/or hardware, or by either earplug in the earphone through software and/or hardware, or by both earplugs in the earphone through software and/or hardware. If it is realized by one earplug, then the earplug may be a main earplug of the earphone, and of course, it may also be a slave earplug, which is not limited in the embodiments of the present application. The main earplug of the earphone may be a left earplug, that is, an earplug worn on the left ear; it may also be a right earplug, that is, an earplug worn on the right ear. As shown in FIG. 2, the wearing detection method for a wearable device may include the following steps.

S201: Acquire detection data of capacitive sensors at the at least two positions.

In the method, a processor of the wearable device may acquire detection data of a capacitive sensor at each position. The detection data of the capacitive sensor at each position may be data obtained by sampling a detection signal of the capacitive sensor at each position.

In a specific implementation, the capacitive sensor at each position may transmit the detection signal to an analog front-end (Analog Front-End, referred to as AFE) circuit connected to the capacitive sensor at each position in the wearable device, and the AFE circuit connected to the capacitive sensor at each position transmits the detection signal to an analog to digital converter (Analog to Digital Converter, referred to as ADC), and the ADC converts the detection signal of the capacitive sensor at each position to obtain a digital signal, which is the detection data. The processor may obtain the detection data of the capacitive sensor at each position from the ADC.

S202: Obtain linear combination data according to the detection data of the capacitive sensors at the at least two positions by using a pre-set linear relationship.

S203: Determine, according to the linear combination data, whether an operating behavior that changes a pre-set initial state of the wearable device is detected.

By executing the S201, the detection data of the capacitive sensor at each position may be acquired. When the detection data of the capacitive sensors at the at least two positions are obtained, the linear combination data may be determined by executing S202, and then S203 is executed to determine whether the operation behavior that changes the pre-set initial state of the wearable device is detected, according to the linear combination data.

S204: Determine the state of the wearable device to be a target state of the operating behavior if the operating behavior is detected.

S205: Determine the state of the wearable device to be the pre-set initial state if the operating behavior is not detected.

When the operation behavior is detected, further, the state of the wearable device may be determined to be the target state of the operation behavior according to the operation behavior, that is, the state of the wearable device may be switched from the pre-set initial state to the target state of the operation behavior.

On the contrary, if the operation behavior is not detected, the state of the wearable device may be determined to be the pre-set initial state, that is, the state of the wearable device is maintained as the pre-set initial state without state switching.

Optionally, if the pre-set initial state is a non-wearing state and the target state is a wearing state, then operations in the wearing state can also be performed, such as starting to play audio data, receiving audio data, sending audio data, or starting detection of a biometric signal, etc.

Optionally, if the pre-set initial state is the wearing state, and the target state is the non-wearing state, operations in the non-wearing state can also be performed, such as stopping playing audio data, stopping receiving audio data, and stopping sending audio data, or, stopping detection of a biometric signal, etc.

In the method, when the wearing state of the wearable device is determined, the operation of the wearing state can be performed to accurately control the wearable device.

Since at least two positions of the wearable device are provided with the capacitive sensors in the solution of the embodiment of the present application, the wearing detection method for a wearable device may be referred to as wearing detection based on a multi-channel solution. For example, if the number of positions where the capacitive sensors are provided in the wearable device is 2, the wearing detection of the multi-channel solution may be referred to as the wearing detection method of a dual-channel solution.

The operation behavior of the wearable device will cause the capacitive sensors at the at least two positions of the wearable device to contact or separate from a human body, so that the detection data of the capacitive sensors at the at least two positions will be changed. Therefore, whether an operation behavior that changes the pre-set initial state of the wearable device is detected may be determined according to the detection data of the capacitive sensors at the two positions, and then the state of the wearable device may be determined according to a detection result of the operation behavior. And, a mis-contact will only make the capacitive sensors at some of the at least two positions to be contacted, but will not make all the sensors at all positions to be contacted, and the mis-dropping will only separate the sensors at some of the at least two positions, but will not separate the sensors at all positions. Therefore, whether the operation behavior that changes the pre-set initial state of the wearable device is detected may be determined according to the detection data of the capacitive sensors at the at least two positions, and then the state of the wearable device may be determined according to a detection result of the operation behavior, which can avoid misjudgment problems such as mis-wearing or mis-dropping during the wearing detection of the wearable device, and improve the wearing detection accuracy of the wearable device.

In addition, if the wearable devices is exposed to water or sweat, etc., or the wearable device is placed on a desktop or a metal conductor, or the wearable device is held in the hand, or the wearable device is placed in a pocket or in other extreme application situations, only the detection data of the capacitive sensors in some positions will be changed, but not the detection data of the capacitive sensors in all positions will be changed. The linear combination data obtained based on the detection data of the capacitive sensors at the at least two positions can effectively reflect a correlation between the detection data of the capacitive sensors at respective positions of the at least two positions. Therefore, based on the detection data of the capacitive sensors at the at least two positions, obtaining linear combination data by using a pre-set linear relationship, detecting an operation behavior that changes a pre-set initial state of the wearable device according to the linear combination data, and then determining a state of the wearable devices, can effectively avoid misjudgment problems that occur during the wearing detection such as mis-wearing and mis-dropping of the wearable device in some extreme application situations.

The sensor at each position is a capacitive sensor, and the detection data may be a capacitive value. Then, determining whether an operation behavior that changes the pre-set initial state of the wearable device is detected based on the detected capacitive values of the capacitive sensors at the at least two positions, and then determining the state of the wearable device according to the detection result of the operation behavior, can save economic costs and realize rapid iterative mass production of the capacitive sensors in the wearable device.

The wearing detection method according to the embodiment of the present application, can acquire detection data of capacitive sensors at at least two positions of the wearable device, obtain linear combination data according to the detection data of the capacitive sensors the at least two positions by using a pre-set relationship, and then determine whether an operation behavior that changes a pre-set initial state of the wearable device is detected according to the linear combination data, and determine a state of the wearable device to be a target state of the operation behavior if the operation behavior is detected, and determine the state of the wearable device to be the pre-set initial state if the operation behavior is not detected. In the method, obtaining linear combination data according to the detection data of the capacitive sensors at the at least two positions by using a pre-set linear relationship, detecting an operation behavior that changes a pre-set initial state of the wearable device according to the linear combination data, and then determining a state of the wearable devices, can effectively avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device.

Figure 3:
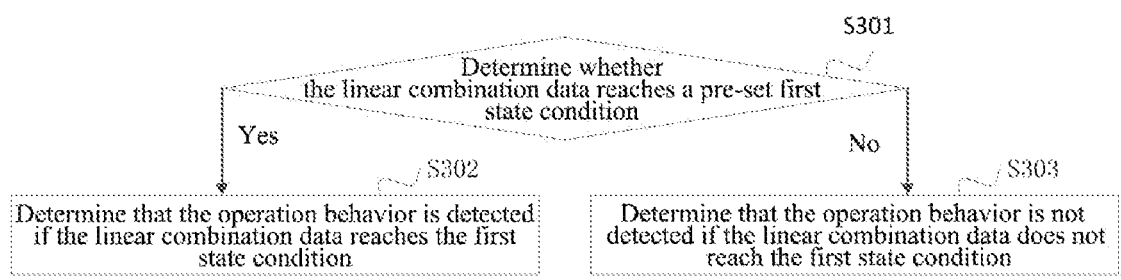
FIG. 3 is a second flowchart of a wearing detection method for a wearable device according to an embodiment of the present application.

The wearable detection method for a wearable device shown in FIG. 2 is illustrated in the following two cases: a pre-set initial state of the wearable device is a non-wearing state and a pre-set initial state of the wearable device is a wearing state. The method can be an example of determining whether an operation behavior that changes the pre-set initial state of the wearable device when the pre-set initial state is the non-wearing state and the target state of the operation behavior is the wearing state in the wearing detection method shown in FIG. 2. FIG. 3 is a second flowchart of a wearing detection method for a wearable device according to an embodiment of the present application. As shown in FIG. 3, determining, according to the linear combination data, whether an operating behavior that changes a pre-set initial state of a wearable device is detected in S203 may include:

S301: Determine whether the linear combination data reaches a pre-set first state condition.

S302: Determine that the operation behavior is detected if the linear combination data reaches the first state condition.

S303: Determine that the operation behavior is not detected if the linear combination data does not reach the first state condition.

In the embodiment, the first state condition may be a condition to enter the wearing state from the non-wearing state.

In an example of the method, for the detection data of the capacitive sensors at the at least two positions obtained by a single sampling, linear combination data of the single sampling may be obtained, and S301 is executed to determine whether the linear combination data of the single sampling reaches the first state condition. If the linear combination data of the single sampling reaches the first state condition, it may be determined that the operation behavior is detected.

In another example of the method, for the detection data of the capacitive sensors at the at least two positions obtained by multiple samplings, linear combination data of the multiple samplings may be obtained, and S302 is executed respectively to determine whether the linear combination data of the multiple samplings all reach the first state condition. If the linear combination data of the multiple samplings all reach the first state condition, it may be determined that the operation behavior is detected.

Taking an in-ear earphone as an example, if the pre-set initial state is the non-wearing state, that is, an off-ear state, and the target state of the operation behavior is the wearing state, that is, an in-ear state, that is, the operation behavior is an in-ear operation, then the first state condition is a condition to enter the in-ear state from the off-ear state.

The wearing detection method for a wearable device according to the embodiment of the present application can determine that the operation behavior is detected when the linear combination data obtained from the detection data of the capacitive sensors at the at least two positions reaches the first state condition, and determine that the operation behavior is not detected if the linear combination data does not reach the first state condition, and then determine the state of the wearable according to a detection result of the operation behavior, which effectively avoids mis-judgement problems of mis-wearing or mis-dropping in wearing detection under some extreme application situations, such as the wearable device being exposed to water or sweat, or, the wearable device being placed on a desktop or a metal conductor, or the wearing device being held in a hand or placed in a pocket, thereby improving the wearing detection accuracy of the wearable device.

Figure 4:
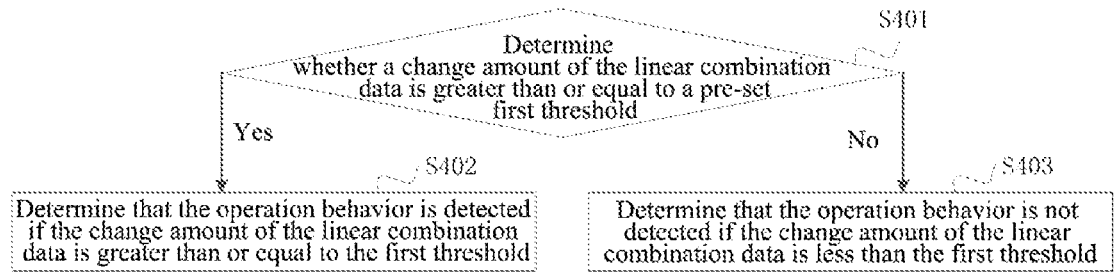
FIG. 4 is a third flowchart of a wearing detection method for a wearable device according to an embodiment of the present application.

FIG. 4 is a third flowchart of a wearing detection method for a wearable device according to an embodiment of the present application. This method can be a possible example of the method shown in FIG. 3, where the pre-set initial state of the wearable device is the non-wearing state, and the target state of the operation behavior is the wearing state. As shown in FIG. 4, determining whether the linear combination data reaches the first state condition in S301 may include:

S401: Determine whether a change amount of the linear combination data is greater than or equal to a pre-set first threshold.

A change amount of the linear combination data may be a difference between the linear combination data and initial combination data. The initial combination data may be a pre-set value, or may be linear combination data obtained from initial data or reference data of capacitive sensors at the at least two positions. The first threshold may be a difference between pre-set combination data for entering the wearing state and the initial combination data. Taking an in-ear earphone as an example, the pre-set combination data for entering the wearing state is pre-set in-ear combination data.

When the wearable device is entering the wearing state from the non-wearing state, detection data of the capacitive sensor at each position will gradually increase. The change amount of the linear combination data obtained based on the detection data of the capacitive sensors at the at least two positions will also gradually increase relative to the initial combination data. Therefore, in this method, it is possible to determine whether a wearing operation of wearable device is an operation to enter the wearing state by determining whether the change amount of the linear combination data is greater than or equal to the pre-set first threshold.

Correspondingly, determining that the operation behavior is detected if the linear combination data reaches the first state condition in the S302, may include:

S402: Determine that the operation behavior is detected if the change amount of the linear combination data is greater than or equal to the first threshold.

When the change amount of the linear combination data is greater than or equal to the first threshold, it may be determined that the linear combination data satisfies a wearing state condition, and thus it can be determined that the operation behavior is detected.

Correspondingly, determining that the operation behavior is not detected if the linear combination data does not reach the first state condition in the S303, may include:

S403: Determine that the operation behavior is not detected if the change amount of the linear combination data is less than the first threshold.

When the change amount of the linear combination data is less than the first threshold, it may be determined that the linear combination data does not satisfy the wearing state condition, and thus it may be determined that the operation behavior is not detected.

The method according to the embodiment of the present application can determine that the operation behavior is detected when the change amount of the linear combination data obtained based on the capacitive sensors at the at least two positions is greater than or equal to the first threshold, and determine that the operation behavior is not detected when the change amount of the linear combination data is less than the first threshold, and then determine the state of the wearable device according to a detection result of the operation behavior, and can avoid mis-judgement problems of mis-wearing or mis-dropping in wearing detection under some extreme application situations, such as the wearable device being exposed to water or sweat, or, the wearable device being placed on a desktop or a metal conductor, or the wearing device being held in a hand or placed in a pocket, thereby improving the wearing detection accuracy of the wearable device.

Figure 5:
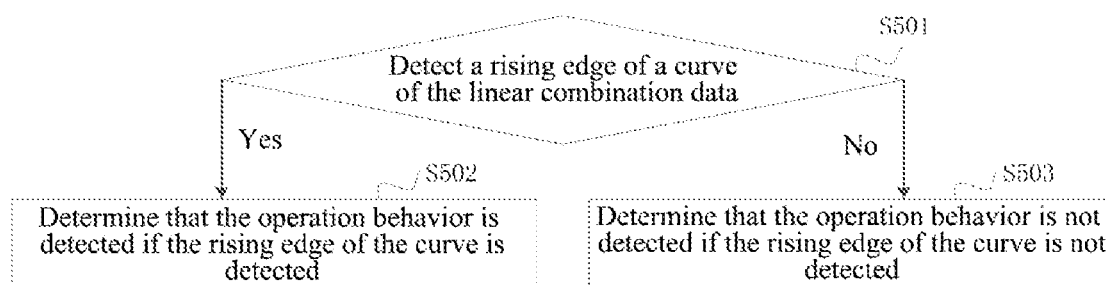
FIG. 5 is a fourth flowchart of a wearing detection method for a wearable device according to an embodiment of the present application.

FIG. 5 is a fourth flowchart of a wearing detection method for a wearable device according to an embodiment of the present application. This method can be another possible example of the method shown in FIG. 3, where the pre-set initial state of the wearable device is the non-wearing state, and the target state of the operation behavior is the wearing state. As shown in FIG. 5, determining whether the linear combination data reaches the first state condition in S301 may include:

S501: Detect a rising edge of a curve of the linear combination data.

When the wearable device is entering the wearing state from the non-wearing state, the detection data of the capacitive sensor at each position will gradually increase from a pre-set reference data. The linear combination data obtained based on the capacitive sensors at the at least two positions is also gradually increasing. Therefore, it is possible to determine whether the operation behavior is detected by detecting the rising edge of the curve of the linear combination data.

Correspondingly, determining that the operation behavior is detected if the linear combination data reaches the first state condition in the S302, includes:

S502: Determine that the operation behavior is detected if the rising edge of the curve is detected.

If the rising edge of the curve of the linear combination data is detected, it may be determined that the linear combination data satisfies a wearing state condition, and thus it may be determined that the operation behavior is detected.

Correspondingly, determining that the operation behavior is not detected if the linear combination data does not reach the first state condition in the S303, includes:

S503: Determine that the operation behavior is not detected if the rising edge of the curve is not detected.

If the rising edge of the curve of the linear combination data is not detected, it may be determined that the wearing state condition is not satisfied, and thus it may be determined that the operation behavior is not detected.

The method according to the embodiment of the present application, can determine that the operation behavior is detected when the rising edge of the curve of the linear combination data obtained based on the detection data of the capacitive sensors at the at least two positions is detected, and determine that the operation behavior is not detected when the rising edge of the curve of the linear combination data is not detected, and then determine the state of the wearable device, which effectively avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device.

Figure 6:
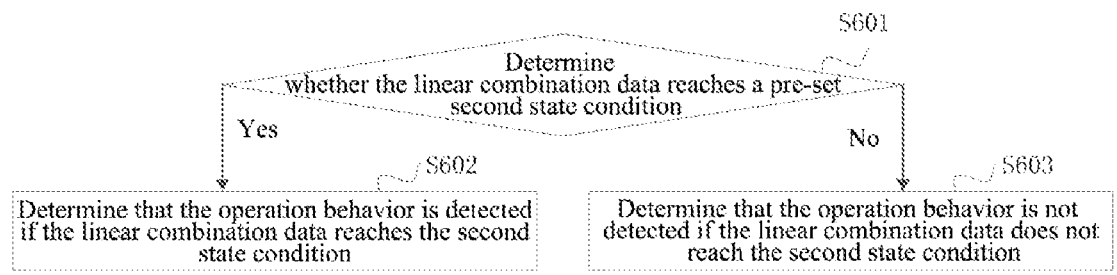
FIG. 6 is a fifth flowchart of a wearing detection method for a wearable device according to an embodiment of the present application.

FIG. 6 is a fifth flowchart of a wearing detection method for a wearable device according to an embodiment of the present application. This method can be an example of determining whether the operation behavior that changes the pre-set initial state of the wearable device is detected in the wearing detection method shown in FIG. 3, where the pre-set initial state is the wearing state, and the target state of the operation behavior is the non-wearing state. As shown in FIG. 6, determining, according to the linear combination data, whether an operating behavior that changes a pre-set initial state of a wearable device is detected in S203 may include:

S601: Determine whether the linear combination data reaches a pre-set second state condition.

S602: Determine that the operation behavior is detected if the linear combination data reaches the second state condition.

S603: Determine that the operation behavior is not detected if the linear combination data does not reach the second state condition.

In the embodiment, the second state condition may be a condition to enter the non-wearing state from the wearing state.

In an example of the method, for the detection data of the capacitive sensors at the at least two positions obtained by a single sampling, linear combination data of the single sampling may be obtained, and S601 is executed to determine whether the linear combination data of the single sampling reaches the second state condition. If the linear combination data of the single sampling reaches the second state condition, it may be determined that the operation behavior is detected.

In another example of the method, for the detection data of the capacitive sensors at the at least two positions obtained by multiple samplings, linear combination data of the multiple samplings may be obtained, and S602 is executed respectively to determine whether the linear combination data of the multiple samplings all reach the second state condition. If the linear combination data of the multiple samplings all reach the second state condition, it may be determined that the operation behavior is detected.

Taking an in-ear earphone as an example, if the pre-set initial state is the wearing state, that is, an in-ear state, and the target state of the operation behavior is the wearing non-state, that is, an off-ear state, then the second state condition is a condition to enter the off-ear state from the in-ear state.

The wearing detection method for a wearable device according to the embodiment of the present application can determine that the operation behavior is detected when the linear combination data obtained from the detection data of the capacitive sensors at the at least two positions reaches the second state condition, and determine that the operation behavior is not detected if the linear combination data does not reach the second state condition behavior, then determine the state of the wearable device according to a detection result of the operation behavior, which effectively avoid mis-judgement problems of mis-wearing or mis-dropping in wearing detection under some extreme application situations, such as the wearable device being exposed to water or sweat, or, the wearable device being placed on a desktop or a metal conductor, or the wearing device being held in a hand or placed in a pocket, thereby improving the wearing detection accuracy of the wearable device.

Figure 7:
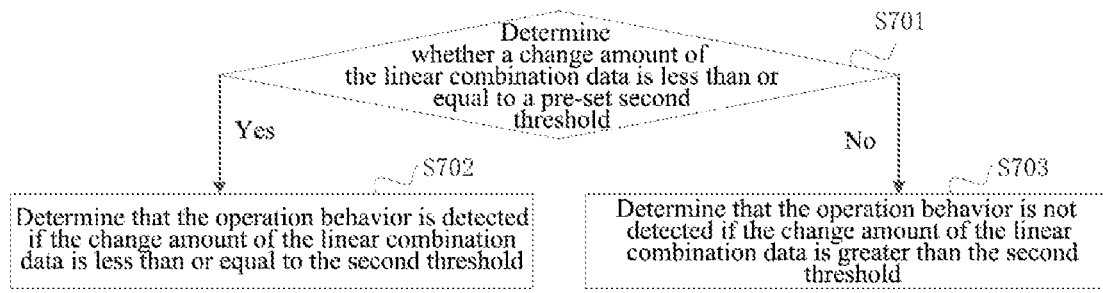
FIG. 7 is a sixth flowchart of a wearing detection method for a wearable device according to an embodiment of the present application.

FIG. 7 is a sixth flowchart of a wearing detection method for a wearable device according to an embodiment of the present application. This method can be a possible example of the method shown in FIG. 6, where the initial state of the wearable device is the wearing state, and the target state of the operation behavior is the non-wearing state. As shown in FIG. 7, determining whether the linear combination data reaches a pre-set second state condition in S601 may include:

S701: Determine whether a change amount of the linear combination data is less than or equal to a pre-set second threshold.

A change amount of the linear combination data may be a difference between the linear combination data and initial combination data. The initial combination data may be a pre-set value, or may be linear combination data obtained from initial data or reference data of capacitive sensors at the at least two positions. The second threshold may be a difference between pre-set combination data for entering the non-wearing state and the initial combination data. Taking an in-ear earphone as an example, the pre-set combination data for entering the non-wearing state is pre-set off-ear combination data.

When the wearable device is entering the non-wearing state from the wearing state, detection data of the capacitive sensor at each position will gradually decrease. The change amount of the linear combination data obtained based on the detection data of the capacitive sensors at the at least two positions will also gradually decrease relative to the initial combination data. Therefore, in this method, it is possible to determine whether the operation behavior is detected by determining whether the change amount of the linear combination data is less than or equal to the pre-set second threshold.

Correspondingly, determining that the operation behavior is detected if the linear combination data reaches the second state condition behavior in the S602, may include:

S702: Determine that the operation behavior is detected if the change amount of the linear combination data is less than or equal to the second threshold.

When the change amount of the linear combination data is less than or equal to the second threshold, it may be determined that the linear combination data satisfies a non-wearing state condition, and thus it may be determined that the operation behavior for the wearable device is detected, and the operation behavior is an operation behavior of entering the non-wearing state.

Correspondingly, determining that the operation behavior is not detected if the linear combination data does not reach the second state condition in S603 includes:

S703: Determine that the operation behavior is not detected if the change amount of the linear combination data is greater than the second threshold.

If the change amount of the linear combination data is greater than the second threshold, that is, not satisfied the non-wearing state condition, it may be determined that the operation behavior of entering the non-wearing state is not detected.

The method according to the embodiment of the present application, can determine that the operation behavior is detected when the change amount of the linear combination data obtained based on the capacitive sensors at the at least two positions is less than or equal to the second threshold, and determine that the operation behavior is not detected when the change amount of the linear combination data is greater than the second threshold, and then determine the state of the wearable device according to a detection result of the operation behavior, which effectively avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device.

Figure 8:
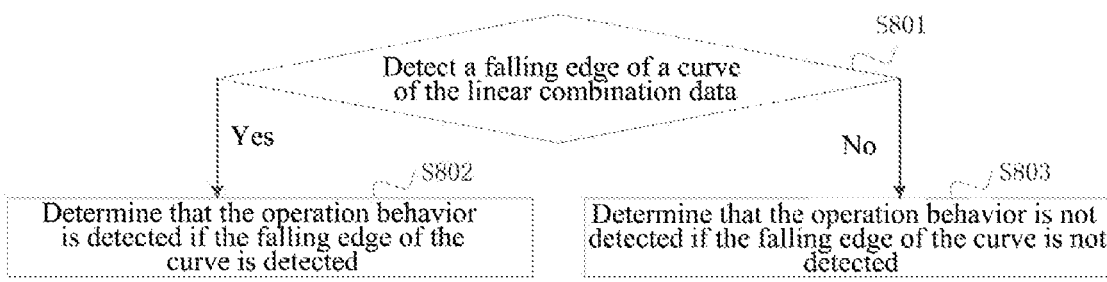
FIG. 8 is a seventh flowchart of a wearing detection method for a wearable device according to an embodiment of the present application.

FIG. 8 is a seventh flowchart of a wearing detection method for a wearable device according to an embodiment of the present application. This method can be another possible example of the method shown in FIG. 6, where the pre-set initial state of the wearable device is the wearing state, and the target state of the operation behavior is the non-wearing state. As shown in FIG. 8, determining whether the linear combination data reaches the second state condition in S301 may include:

S801: Detect a falling edge of a curve of the linear combination data.

When the wearable device is entering the non-wearing state from the wearing state, the detection data of the capacitive sensor at each position will gradually decrease. The linear combination data obtained based on the capacitive sensors at the at least two positions is also gradually decreasing. Therefore, it is possible to determine whether the operation behavior is detected by detecting the falling edge of the curve of the linear combination data.

Correspondingly, determining that the operation behavior is detected if the linear combination data reaches the second state condition in the S602, may include:

S802: Determine that the operation behavior is detected if the falling edge of the curve is detected.

If the falling edge of the curve of the linear combination data is detected, it may be determined that the linear combination data satisfies a non-wearing state condition, and thus it may be determined that the operation behavior is detected to be an operation behavior of entering the non-wearing state.

Correspondingly, determining that the operation behavior is not detected if the linear combination data does not reach the second state condition in S603 behavior, may include:

S803: Determine that the operation behavior is not detected if the falling edge of the curve is not detected.

If the falling edge of the curve of the linear combination data is not detected, that is, the wearing state condition is not satisfied, it may be determined that the operation behavior of entering the non-wearing state is not detected The method according to the embodiment of the present application, can determine that the operation behavior is detected when the falling edge of the curve of the linear combination data obtained based on the detection data of the capacitive sensors at the at least two positions is detected, and determine that the operation behavior is not detected when the falling edge of the curve of the linear combination data is not detected, and then determine the state of the wearable device according a detection result of the operation behavior, which effectively avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device.

Figure 9:
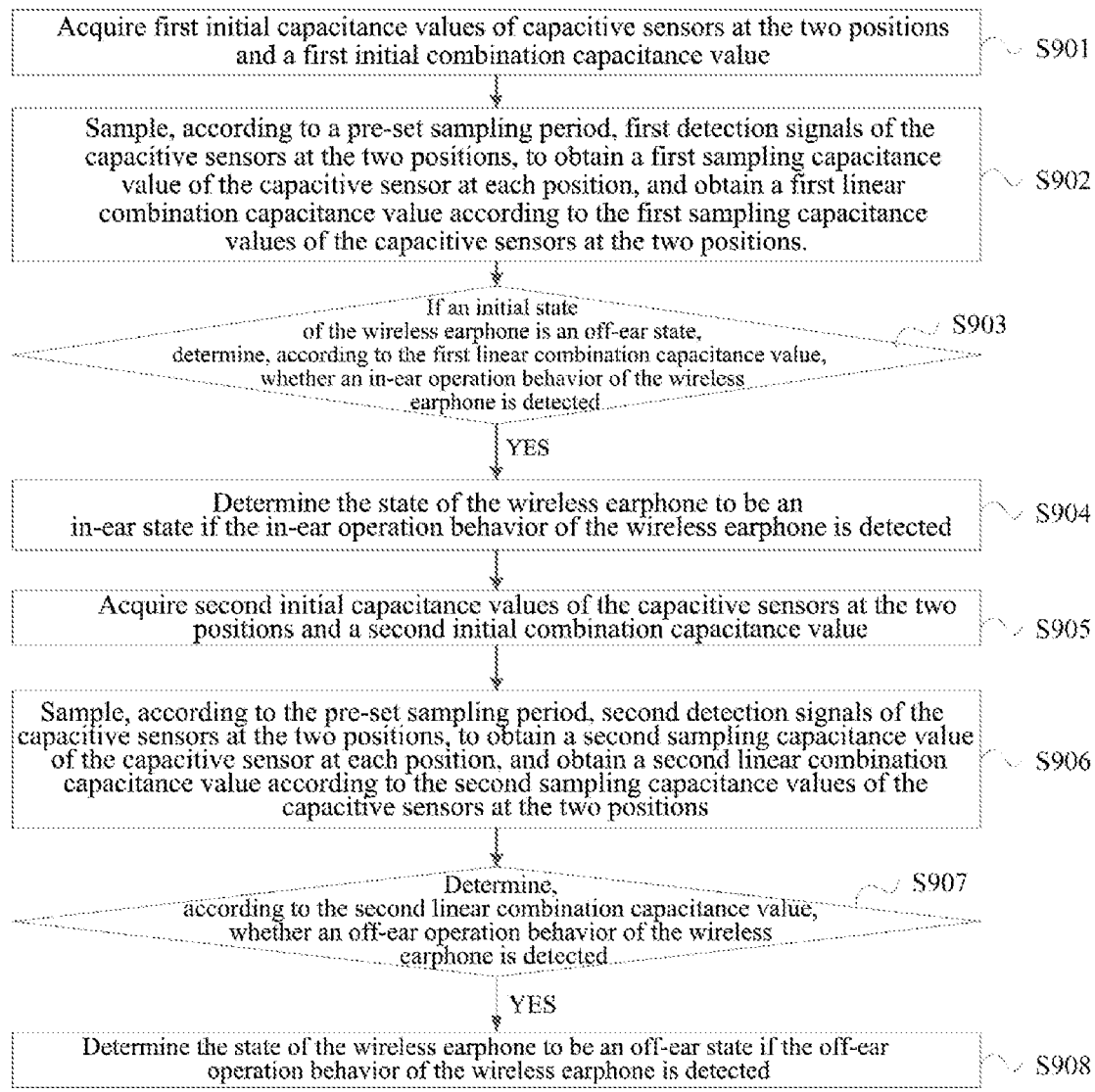
FIG. 9 is an eighth flowchart of a wearing detection method for a wearable device according to an embodiment of the present application.

An embodiment of the present application may also provide a wearing detection method for a wearable device, and any of the foregoing methods may be described through specific examples. In this example, sensors at two positions in an earphone body 11 of a wireless earphone are capacitive sensors as an example. The sensors at the two positions may be represented as a first sensor (sensor1) and a second sensor (sensor2), respectively. FIG. 9 is an eighth flowchart of a wearing detection method for a wearable device according to an embodiment of the present application. As shown in FIG. 9, the wearing detection method for a wearable device may include:

S901: Acquire first initial capacitance values of the capacitive sensors at the two positions and a first initial combination capacitance value.

A first initial capacitance value of the first sensor may be expressed as C10, which may be referred to as a reference capacitance of the first sensor; a first initial capacitance value of the second sensor may be expressed as C20, which may be referred to as a reference capacitance of the second sensor; The first initial combination capacitance value may be expressed as C30, which may be referred to as a combination reference capacitance.

S902: Sample, according to a pre-set sampling period, first detection signals of the capacitive sensors at the two positions, to obtain a first sampling capacitance value of the capacitive sensor at each position, and obtain a first linear combination capacitance value according to the first sampling capacitance values of the capacitive sensors at the two positions.

A first sampling capacitance value of the first sensor obtained in an nth sampling may be expressed as $C1n0$; a first sampling capacitance value of the second sensor obtained in the nth sampling may be expressed as $C2n0$. A first linear combination capacitance value obtained based on the first sampling capacitance of the first sensor sampled at the nth sampling and the first sampling capacitance of the second sensor sampled at the nth sampling may be expressed as $C3n0$.

The $C3n0$ may be obtained according to $C1n0$ and $C2n0$ by using a pre-set linear relationship.

The pre-set linear relationship may be as follows: $C3n0=K1*C1n0+K2*C2n0$, where, n represents the nth sampling, and K1 and K2 may be pre-set constants.

S903: If an initial state of the wireless earphone is an off-ear state, determine, according to the first linear combination capacitance value, whether an in-ear operation behavior of the wireless earphone is detected.

In this method, a first capacitance value change amount of the first sensor may be obtained according to the first sampling capacitance value and the first initial capacitance value of the first sensor. A first capacitance value change amount of the second sensor may be obtained according to the first sampling capacitance value and the first initial capacitance value of the second sensor. A first combination capacitance value change amount may be obtained according to the first linear combination capacitance value and the first initial combination capacitance value. Taking the nth sampling as an example, the first capacitance value change amount of the first sensor is: $DetaC1n0=C1n0-C10$. The first capacitance value change amount of the second sensor is: $DetaC2n0=C2n0-C20$; the first combination capacitance value change amount is: $DetaC3n0=C3n0-C30$.

In an implementation, the change amount of the first linear combination capacitance value $DetaC3n0$ may be compared with a pre-set in-ear combination threshold $OnTh3$. If $DetaC3n0>OnTh3$, it may be determined that the in-ear operation behavior of the wireless earphone is detected.

In another implementation, a rising edge of a curve of the first linear combination capacitance value may be detected. If the rising edge of the curve is detected, it may be determined that the in-ear operation behavior of the wireless earphone is detected.

S904: If the in-ear operation behavior of the wireless earphone is detected, determine the state of the wireless earphone to be an in-ear state.

On the contrary, if the in-ear operation behavior of the wireless earphone is not detected, determine the state of the wireless earphone to be an off-ear state.

S905: Acquire second initial capacitance values of the capacitive sensors at the two positions and a second initial combination capacitance value.

A second initial capacitance value of the first sensor may be expressed as $C11$, which may be referred to as a reference capacitance of the first sensor; a second initial capacitance value of the second sensor may be expressed as $C21$, which may be referred to as a reference capacitance of the second sensor; The second initial combination capacitance value may be expressed as $C31$, which may be referred to as a combination reference capacitance.

S906: Sample, according to the pre-set sampling period, second detection signals of the capacitive sensors at the two positions, to obtain a second sampling capacitance value of the capacitive sensor at each position, and obtain a second linear combination capacitance value according to the second sampling capacitance values of the capacitive sensors at the two positions.

A second sampling capacitance value of the first sensor obtained in the nth sampling may be expressed as $C1n1$; a second sampling capacitance value of the second sensor obtained in the nth sampling may be expressed as $C2n1$. A second linear combination capacitance value obtained based on the second sampling capacitance of the first sensor sampled at the nth sampling and the second sampling capacitance of the second sensor sampled at the nth sampling may be expressed as $C3n1$.

The $C3n1$ may be obtained according to $C1n1$ and $C2n1$ by using a pre-set linear relationship.

The pre-set linear relationship may be as follows: $C3n1=K1*C1n1+K2*C2n1$, where, n represents the nth sampling, and K1 and K2 may be pre-set constants.

S907: Determine, according to the second linear combination capacitance value, whether an off-ear operation behavior of the wireless earphone is detected.

In this method, a second capacitance value change amount of the first sensor may be obtained according to the second sampling capacitance value and the second initial capacitance value of the first sensor. A second capacitance value change amount of the second sensor may be obtained according to the second sampling capacitance value and the second initial capacitance value of the second sensor. A second combination capacitance value change amount may be obtained according to the second linear combination capacitance value and the second initial combination capacitance value. Taking the nth sampling as an example, the second capacitance value change amount of the first sensor is: $DetaC1n1=C1n1-C11$. The second capacitance value change amount of the second sensor is: $DetaC2n1=C2n1-C21$; the combination capacitance value change amount is: $DetaC3n1=C3n1-C31$.

In an implementation, the change amount of the second linear combination capacitance value $DetaC3n1$ may be compared with a pre-set off-ear combination threshold $OffTh3$. If $DetaC3n1<OffTh3$, it may be determined that the off-ear operation behavior of the wireless earphone is detected.

In another implementation, a falling edge of a curve of the second linear combination capacitance value may be detected. If the falling edge of the curve is detected, it may be determined that the off-ear operation behavior of the wireless earphone is detected.

S908: If the off-ear operation behavior of the wireless earphone is detected, determine the state of the wireless earphone to be an off-ear state.

On the contrary, if the off-ear operation behavior of the wireless earphone is not detected, determine the state of the wireless earphone to be an in-ear state.

The wearing detection method for a wearable device according to the embodiment of the present application, can determine whether the operation behavior of the wireless earphone is detected according to a linear combination capacitance value obtained by the capacitance values of the capacitive sensors at the two positions, and determine the state of the wearable device according to a detection result of the operation behavior, and also can avoid mis-judgement problems of mis-wearing or mis-dropping in wearing detection under some extreme application situations, such as the wearable device being exposed to water or sweat, etc., or, the wearable device being placed on a desktop or a metal conductor, or the wearing device being held in a hand or placed in a pocket, thereby improving the wearing detection accuracy of the wearable device. At the same time, in the case where it is determined that the operation behavior for the wearable device is detected, the wearing state of the wearable device can also be determined, so as to accurately control the wearable device.

The following describes an apparatus that performs the above wearing detection method, a wearable device, and a storage medium etc.

Figure 10:
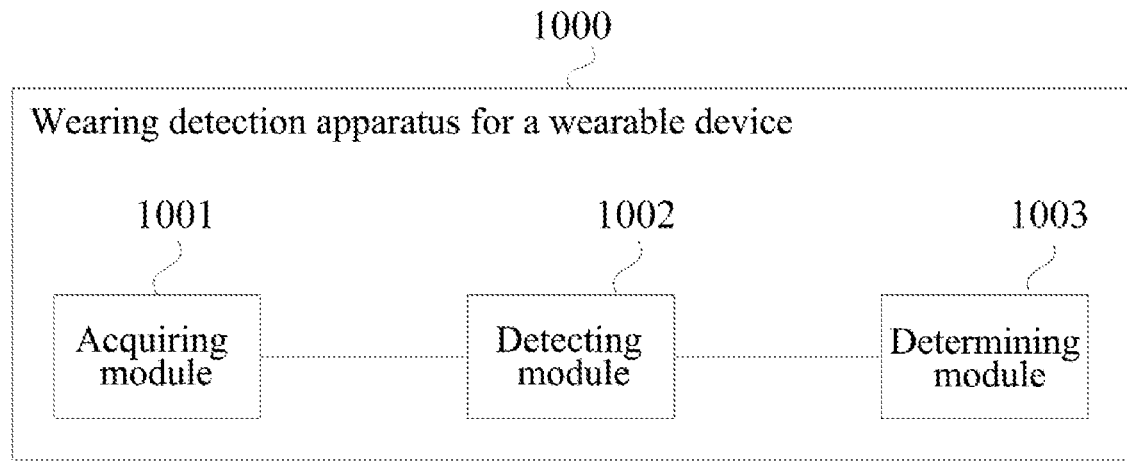
FIG. 10 is a schematic structural diagram of a wearing detection apparatus for a wearable device according to an embodiment of the present application.

FIG. 10 is a schematic structural diagram of a wearing detection apparatus for a wearable device according to an embodiment of the present application. At least two positions of the wearable device are provided with capacitive sensors. As shown in FIG. 10, a wearing detection apparatus for a wearable device 1000 may include:

an acquiring module 1001, configured to acquire detection data of the capacitive sensors at the at least two positions;

a detecting module 1002, configured to obtain linear combination data according to the detection data of the capacitive sensors at the at least two positions by using a pre-set linear relationship; and determine whether an operation behavior that changes a pre-set initial state of the wearable device is detected according to the linear combination data; and a determining module 1003, configured to determine a state of the wearable device to be a target state of the operation behavior if the operation behavior is detected; and determine the state of the wearable device to be the pre-set initial state if the operation behavior is not detected.

Optionally, the pre-set initial state is a non-wearing state, and the target state of the operation behavior is a wearing state. The detecting module 1002 is specifically configured to determine whether the linear combination data reaches a first state condition; determine the operation behavior is detected if the linear combination data reaches the first state condition; and determine the operation behavior is not detected if the linear combination data does not reach the first state condition.

Optionally, the detecting module 1002 is specifically configured to determine whether a change amount of the linear combination data is greater than or equal to a pre-set first threshold; determine the operation behavior is detected if the change amount of in the linear combination data is greater than or equal to the first threshold; and determine the operation behavior is not detected if the change amount of the linear combination data is less than the first threshold.

Optionally, the detecting module 1002 is specifically configured to detect a rising edge of a curve of the linear combination data; determine the operation behavior is detected if the rising edge of the curve is detected; and determine the operation behavior is not detected if the rising edge of the curve is not detected.

Optionally, the pre-set initial state is a wearing state, and the target state of the operation behavior is a non-wearing state. The detecting module 1002 is specifically configured to determine whether the linear combination data reaches a pre-set second state condition; determine the operation behavior is detected if the linear combination data reaches the second state condition; and determine the operation behavior is not detected if the linear combination data does not reach the second state condition.

Optionally, the detecting module 1002 is specifically configured to determine whether the change amount of the linear combination data is less than or equal to a pre-set second threshold; determine the operation behavior is detected if the change amount of the linear combination data is less than or equal to the second threshold; and determine the operation behavior is not detected if the change amount of the linear combination data is greater than the second threshold.

Optionally, the detecting module 1002 is specifically configured to detect a falling edge of a curve of the linear combination data; determine the operation behavior is detected if the falling edge of the curve is detected; and determine the operation behavior is not detected if the falling edge of the curve is not detected.

The wearable device according to the embodiment of the present application can execute the wearing detection method for a wearable device shown in any of the above FIGS. 2 to 9. For the specific implementations and beneficial effects of the wearable device, reference can be made to the above, which will not be repeated here.

Figure 11:
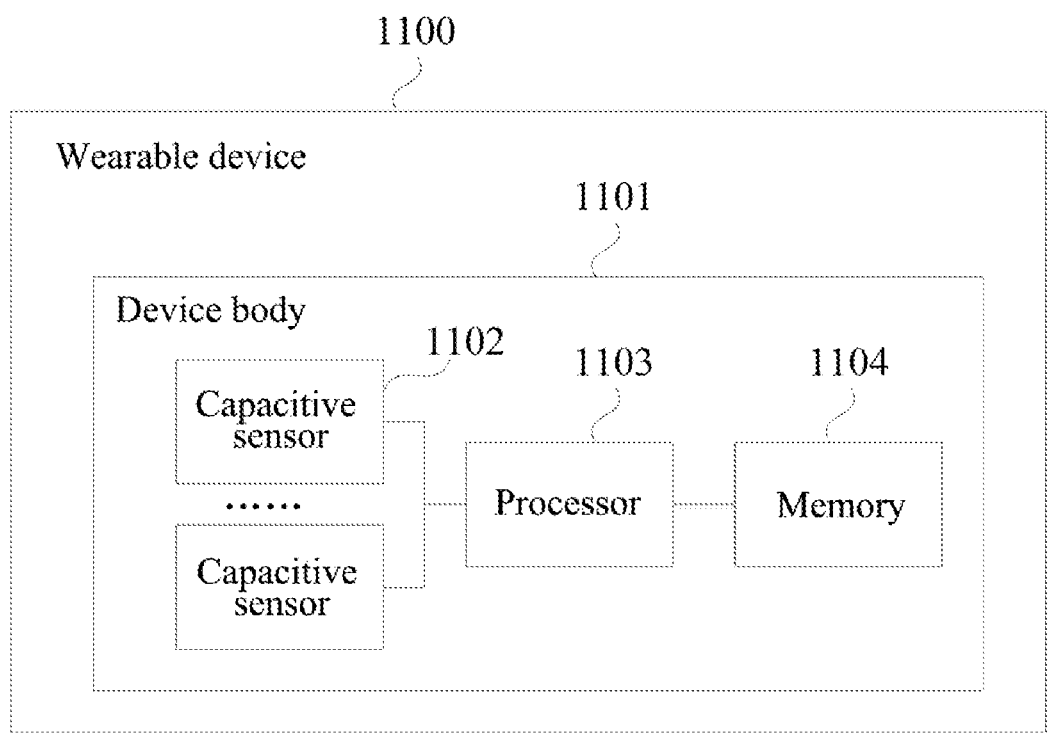
FIG. 11 is a schematic structural diagram of a wearable device according to an embodiment of the present application.

An embodiment of the present application also provides a wearable device. FIG. 11 is a schematic structural diagram of a wearable device according to an embodiment of the present application. As shown in FIG. 11, a wearable device 1100 of the present embodiment includes: a device body 1101, and capacitive sensors 1102 disposed at at least two positions in the device body 1101, and the device body 1101 further includes: a processor 1103 and a memory 1104. The processor 1103 is connected to the capacitive sensors 1102 at the at least two positions; the processor 1103 is also connected to the memory 1104.

The memory 1104 is configured to store program instructions.

The processor 1103 is configured to execute the wearing detection method for a wearable device according to any one of FIGS. 2 to 9 when calling the program instructions stored in the memory.

Optionally, among the at least two positions, there are two adjacent positions with a distance therebetween being greater than or equal to a pre-set distance.

Optionally, the wearable device 1100 is an earphone or a hearing aid device.

An embodiment of the present application also provides a computer-readable storage medium on which a computer program is stored, and the computer program may be executed by the processor 1103 described in FIG. 11 to implement the wearing detection method for a wearable device described in any of the above FIGS. 2-9 in any embodiments. For specific implementations and effective effects thereof, reference can be made to the above, which will not be repeated here.

Persons of ordinary skill in the art may understand that all or a part of the steps of the method embodiments may be implemented by a program instructing relevant hardware. The foregoing program may be stored in a computer readable storage medium. When the program is executed, steps of the method embodiments are performed. The foregoing storage medium a ROM, a RAM, a magnetic disk, or an optical disk and other media that can store program codes.

Finally, it should be noted that the above embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all of the technical features thereof, however, such modifications or substitutions do not make the essence of the corresponding technical solutions deviate from the scope of the technical solutions of the embodiments of the present application.

What is claimed is:

1. A wearing detection method for a wearable device, at least two positions of the wearable device having capacitive sensors, the method comprising:

acquiring detection data of the capacitive sensors at the at least two positions;

obtaining linear combination data according to the detection data of the capacitive sensors at the at least two positions by using a pre-set linear relationship;

determining, according to the linear combination data, whether an operation behavior that changes a pre-set initial state of the wearable device is detected;

determining a state of the wearable device to be a target state of the operation behavior if the operating behavior is detected; and determining the state of the wearable device to be the pre-set initial state if the operating behavior is not detected.

2. The method according to claim 1, wherein the pre-set initial state is a non-wearing state, the target state of the operation behavior is a wearing state, and the determining, according to the linear combination data, of whether an operation behavior that changes a pre-set initial state of the wearable device is detected, comprises:

determining whether the linear combination data reaches a pre-set first state condition;

determining that the operating behavior is detected if the linear combination data reaches the first state condition; and determining that the operating behavior is not detected if the linear combination data does not to reach the first state condition.

3. The method according to claim 2, wherein the determining of whether the linear combination data reaches a pre-set first state condition comprises:

determining whether a change amount of the linear combination data is greater than or equal to a pre-set first threshold;

determining that the operation behavior is detected if the change amount of the linear combination data is greater than or equal to the first threshold; and determining that the operation behavior is not detected if the change amount of the linear combination data is less than the first threshold.

4. The method according to claim 2, wherein the determining of whether the linear combination data reaches a pre-set first state condition comprises:

detecting a rising edge of a curve of the linear combination data;

determining that the operation behavior is detected if the rising edge of the curve is detected; and determining that the operation behavior is not detected if the rising edge of the curve is not detected.

5. The method according to claim 1, wherein the pre-set initial state is a wearing state, the target state of the operation behavior is a non-wearing state, and the determining, according to the linear combination data, of whether an operation behavior that changes a pre-set initial state of the wearable device is detected, comprises:

determining whether the linear combination data reaches a pre-set second state condition;

determining that the operation behavior is detected if the linear combination data reaches the second state condition; and determining that the operation behavior is not detected if the linear combination data does not reach the second state condition.

6. The method according to claim 5, wherein the determining of whether the linear combination data reaches a pre-set second state condition comprises:

determining whether a change amount of the linear combination data is less than or equal to a pre-set second threshold;

determining that the operation behavior is detected if the change amount of the linear combination data is less than or equal to the second threshold; and determining that the operation behavior is not detected if the change amount of the linear combination data is greater than the second threshold.

7. The method according to claim 5, wherein the determining of whether the linear combination data reaches a pre-set second state condition comprises:

detecting a falling edge of a curve of the linear combination data;

determining that the operation behavior is detected if the falling edge of the curve is detected; and determining that the operation behavior is not detected if the falling edge of the curve is not detected.

8. The method according to claim 1, wherein, among the at least two positions, there are at least two positions with a distance therebetween being greater than or equal to a pre-set distance.

9. A wearing detection apparatus for a wearable device, wherein at least two positions of the wearable device are provided with capacitive sensors, and the apparatus comprises a processor and a memory connected with the processor, wherein the memory is configured to store program instructions, and the processor, when executing the program instructions, is configured to:

acquire detection data of the capacitive sensors at the at least two positions;

obtain linear combination data according to the detection data of the capacitive sensors at the at least two positions by using a pre-set linear relationship; and determine whether an operation behavior that changes a pre-set initial state of the wearable device is detected according to the linear combination data; and determine a state of the wearable device to be a target state of the operation behavior if the operation behavior is detected; and determine the state of the wearable device to be the pre-set initial state if the operation behavior is not detected.

10. The apparatus according to claim 9, wherein the pre-set initial state is a non-wearing state, and the target state of the operation behavior is a wearing state; and the processor is configured to:

determine whether the linear combination data reaches a pre-set first state condition; determine that the operation behavior is detected if the linear combination data reaches the first state condition; and determine that the operation behavior is not detected if the linear combination data does not reach the first state condition.

11. The apparatus according to claim 10, wherein the processor is further configured to:

determine whether a change amount of the linear combination data is greater than or equal to a pre-set first threshold; determine that the operation behavior is detected if the change amount of the linear combination data is greater than or equal to the first threshold; and determine that the operation behavior is not detected if the change amount of the linear combination data is less than the first threshold.

12. The apparatus according to claim 10, wherein the processor is further configured to:

detect a rising edge of a curve of the linear combination data; determine that the operation behavior is detected if the rising edge of the curve is detected; and determine that the operation behavior is not detected if the rising edge of the curve is not detected.

13. The apparatus according to claim 9, wherein the pre-set initial state is a wearing state, and the target state of the operation behavior is a non-wearing state; and the processor is configured to:

determine whether the linear combination data reaches a pre-set second state condition; determine that the operation behavior is detected if the linear combination data reaches the second state condition; and determine that the operation behavior is not detected if the linear combination data does not reach the second state condition.

14. The apparatus according to claim 13, wherein the processor is further configured to:

determine whether a change amount of the linear combination data is less than or equal to a pre-set second threshold; determine that the operation behavior is detected if the change amount of the linear combination data is less than or equal to the second threshold; determine that the operation behavior is not detected if the change amount of the linear combination data is greater than the second threshold.

15. The apparatus according to claim 13, wherein the processor is further configured to:

detect a falling edge of a curve of the linear combination data; determine that the operation behavior is detected if the falling edge of the curve is detected; and determine that the operation behavior is not detected if the falling edge of the curve is not detected.

16. A wearable device, comprising: a device body, wherein at least two positions of the device body are provided with capacitive sensors, and the device body further comprises a processor and a memory, wherein the processor is connected to the capacitive sensors at the at least two positions and the processor is also connected to the memory;

the memory is configured to store program instructions; and the processor is configured to execute the wearing detection method for a wearable device according to claim 1 when calling the program instructions stored in the memory.

17. The wearable device according to claim 16, wherein among the at least two positions, there are two adjacent positions with a distance therebetween being greater than or equal to a pre-set distance.

18. A non-volatile computer-readable storage medium, wherein the storage medium stores a computer program, and when the computer program is executed by a processor, the wearable detection method for a wearable device according to claim 1 is implemented.

* * * * *